T. GLANDING.
TRUNK.
No. 9,911. Reissued Oct. 25, 1881.
FIG. I.
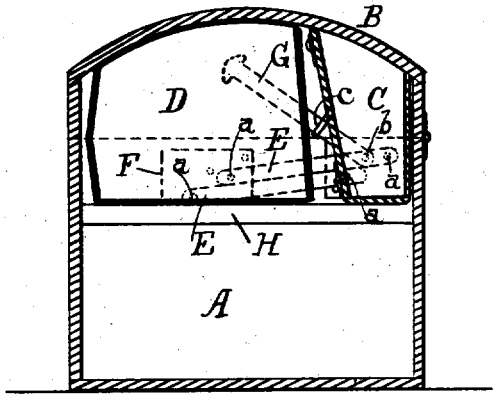
FIG. II.
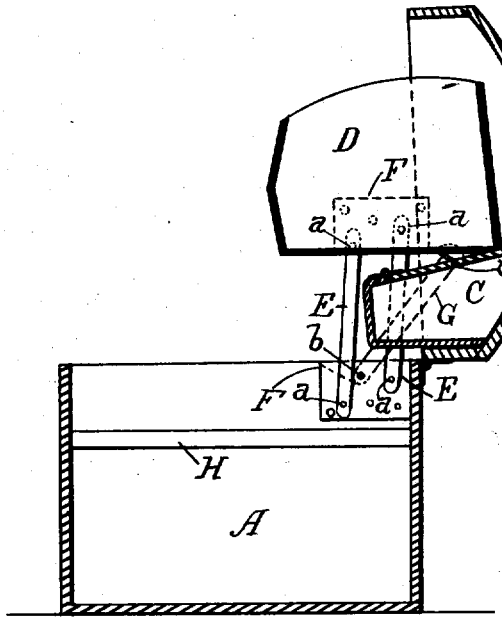
FIG. III.
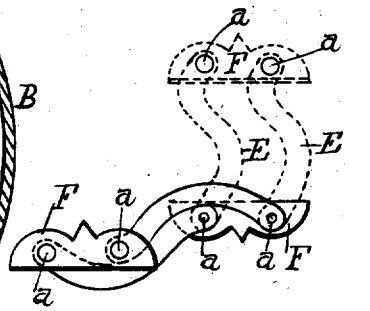
WITNESSES:
H. A. Brooks
Chas. E. Lewis
INVENTOR:
Thomas Glanding
by Geo. H. T. Howard
Attys.
N. PETERS, Photo-Lithographer, Washington, D. C.

UNITED STATES PATENT OFFICE.

THOMAS GLANDING, OF BALTIMORE, MARYLAND.

TRUNK.

SPECIFICATION forming part of Reissued Letters Patent No. 9,911, dated October 25, 1881.

Original No. 220,020, dated September 30, 1879. Application for reissue filed August 20, 1881.

*To all whom it may concern:*

Be it known that I, THOMAS GLANDING, of the city of Baltimore, and State of Maryland, have invented certain Improvements in Trunks, of which the following is a specification.

This invention relates to certain improvements in the construction of a trunk, whereby the larger tray thereof, in its elevation from a position within the body, is carried back so as to extend partially into the lid, thereby giving access to the interior of the body without the tray being removed to a place exteriorly of the trunk. To effect this change in the position of the tray as the same is elevated, I connect the tray and body at their ends by means of parallel arms, which are pivoted to the said parts of the trunk, or to plates secured thereto, as hereinafter described.

In the further description of my said invention which follows reference is made to the accompanying drawings forming a part hereof, and in which—

Figure I is a vertical transverse section of a closed trunk provided with my improvements. Fig. II is a similar view of the improved trunk with the lid raised and the trays elevated.

Similar letters of reference indicate similar parts in all the views.

A and B represent, respectively, the body and lid of a trunk of ordinary description.

C is a small tray, attached to the lid in such manner that when the trunk is closed the tray extends into the body.

D is the larger tray, connected to the body of the trunk at its ends by means of parallel arms E E. The said arms are connected directly to the tray and the body of the trunk by means of pivots *a*, or they may be pivoted to plates F, which in turn are secured to the said parts. In Figs. I and II the parallel arms are straight, while in Fig. III the said arms are represented as curved.

G is a stay pivoted to the body of the trunk at *b*, and attached to the lid by means of a staple, *c*, and it has a knob or projection at its upper end, which, as the lid is opened, comes in contact with said staple and prevents the lid from falling back. The staple also guides the stay as the lid is closed, and prevents the end thereof from coming into contact with the lid or the tray-rest H.

I claim as my invention—

1. As means for guiding a tray of a trunk from a position within the body thereof to an elevated one partially within the lid, a pair of parallel arms pivoted at their ends to plates which confine the said pivoted arms at a fixed distance apart, the said plates being adapted for attachment to the said parts of the trunk, substantially as specified.

2. The combination of the body A, longitudinal tray D, the parallel arms E, pivoted to the ends of the body A and tray D, and the lid provided with the tray C, partially in said lid and partially in the body when the trunk is closed, the tray D being adapted to rest upon the tray C in the lid when raised from the body, as set forth.

THOS. GLANDING.

Witnesses:

ED. RAINE,

CHAS. E. LEWIS.